(12) United States Patent
Pei et al.

(10) Patent No.: US 11,634,222 B2
(45) Date of Patent: Apr. 25, 2023

(54) VERTICAL TAKE-OFF AND LANDING UNMANNED AERIAL VEHICLE HAVING FOLDABLE FIXED WING AND BASED ON TWIN-DUCTED FAN POWER SYSTEM

(71) Applicant: South China University of Technology, Guangzhou (CN)

(72) Inventors: Hailong Pei, Guangzhou (CN); Zihuan Cheng, Guangzhou (CN)

(73) Assignee: South China University of Technology

( * ) Notice: Subject to any disclaimer, the term of this patent is extended or adjusted under 35 U.S.C. 154(b) by 0 days.

(21) Appl. No.: 16/613,930

(22) PCT Filed: Nov. 16, 2017

(86) PCT No.: PCT/CN2017/111341
§ 371 (c)(1),
(2) Date: Nov. 15, 2019

(87) PCT Pub. No.: WO2018/209911
PCT Pub. Date: Nov. 22, 2018

(65) Prior Publication Data
US 2022/0081111 A1 Mar. 17, 2022

(30) Foreign Application Priority Data
May 16, 2017 (CN) .......................... 201710343539.0

(51) Int. Cl.
*B64C 39/02* (2006.01)
*B64C 11/00* (2006.01)
*B64C 29/02* (2006.01)

(52) U.S. Cl.
CPC .......... *B64C 39/024* (2013.01); *B64C 11/001* (2013.01); *B64C 29/02* (2013.01);
(Continued)

(58) Field of Classification Search
CPC ... B64C 3/546; B64C 29/02; B64C 2201/021; B64C 2201/102; B64C 2201/162
See application file for complete search history.

(56) References Cited

U.S. PATENT DOCUMENTS

| 2012/0070289 A1 | 3/2012 | Charier et al. |
| 2012/0234968 A1* | 9/2012 | Smith .................... B64D 17/64 244/12.3 |

(Continued)

FOREIGN PATENT DOCUMENTS

| CN | 101857086 U | 10/2010 |
| CN | 202966660 A | 6/2013 |

(Continued)

*Primary Examiner* — Tye William Abell
(74) *Attorney, Agent, or Firm* — The Webb Law Firm (57) ABSTRACT

A vertical take-off and landing (VTOL) unmanned aerial vehicle having a foldable fixed wing and a twin-ducted fan power system (7) arranged at a tail portion of a fuselage in a transverse and tail propulsion arrangement provides lift for vertical take-off and landing and propulsion for horizontal flight. By means of deflection of a control servo plane arranged at a duct exit, a vectored thrust is provided to enable a fast attitude change. When the aerial vehicle takes off and lands vertically/flies at a low speed, the wing is folded to reduce the frontal area exposure to crosswind. When the aerial vehicle is flying horizontally, the wing is expanded to obtain larger lift. A Coanda effect is created at a trailing edge of the wing by suction of the duct to improve performance.

9 Claims, 5 Drawing Sheets

(52) U.S. Cl.
CPC .. *B64C 2201/021* (2013.01); *B64C 2201/042* (2013.01); *B64C 2201/102* (2013.01); *B64C 2201/108* (2013.01); *B64C 2201/162* (2013.01)

(56) References Cited

U.S. PATENT DOCUMENTS

| | | | | |
|---|---|---|---|---|
| 2013/0206921 A1* | 8/2013 | Paduano | ................ | B64C 13/16 |
| | | | | 244/7 C |
| 2015/0102157 A1* | 4/2015 | Godlasky | ............. | B64C 39/024 |
| | | | | 244/13 |
| 2016/0096613 A1* | 4/2016 | Johnson | ................. | B64C 29/04 |
| | | | | 244/13 |
| 2019/0100308 A1* | 4/2019 | Simionescu | .......... | B64C 39/022 |
| 2020/0172243 A1* | 6/2020 | Chan | ....................... | B64C 39/10 |

FOREIGN PATENT DOCUMENTS

| | | |
|---|---|---|
| CN | 103231805 A | 8/2013 |
| CN | 105711837 A | 6/2016 |
| CN | 105947192 A | 9/2016 |
| CN | 106494608 A | 3/2017 |
| CN | 107176286 A | 9/2017 |

* cited by examiner

VERTICAL TAKE-OFF AND LANDING UNMANNED AERIAL VEHICLE HAVING FOLDABLE FIXED WING AND BASED ON TWIN-DUCTED FAN POWER SYSTEM

CROSS-REFERENCE TO RELATED APPLICATIONS

This application is the United States national phase of International Application No. PCT/CN2017/111341 filed Nov. 16, 2017, and claims priority to Chinese Patent Application No. 201710343539.0 filed May 16, 2017, the disclosures of which are hereby incorporated by reference in their entirety.

TECHNICAL FIELD

The present invention relates to the technical field of aerial vehicles, and in particular to a vertical take-off and landing unmanned aerial vehicle having a foldable fixed wing and based on a twin-ducted fan power system.

BACKGROUND ART

Vertical take-off and landing aerial vehicles have always been a hot spot in the aeronautical engineering research. In recent years, due to the advance in materials, energy sources, power and control technology, many advanced solutions have been applied to the vertical take-off and landing aerial vehicles. At present, the several types of designs enabling a shipborne vertical take-off and landing aerial vehicle configuration include a tilting power mechanism (containing a tilting wing, etc.), auxiliary vertical lift, and a tail-sitter structure.

(1) At present, a tilt rotor is the most typical vertical take-off and landing solution, and achieves both functions of a helicopter rotor and a fixed-wing propeller by means of rotating a rotor shaft. The most typical aircraft is the American V-22 "Osprey". However, a complicated rotation mechanism design is required for a tilting mechanism, its structure is often damaged resulting from adverse factors, such as under a gyro alternating moment generated by a powered rotating propeller/wing, and it is difficult to achieve stable aerodynamic effects on tilting airfoils at a low speed and during transition. At present, a large number of accidents and even frequent crashes occur in the practical process (reports of V-22 Osprey crashes sometimes occur). Moreover, the rotating mechanism has low utilization and becomes an unnecessary load during cruising flight, affecting the overall flight performance.

(2) Another feasible solution is to employ an auxiliary vertical lift system, in which a rotor or a power fan in a vertical direction is additionally installed on a traditional fixed-wing aircraft, such that a rotor thrust is directly generated in the vertical direction for the vertical take-off and landing and the attitude control. Fixed-wing and quad-rotor composite aircrafts have become a hot spot in recent years due to their simple structure and easy design and control. At present, American Latitude Engineering LLC. is the world leader in the composite quad-rotor technology. Its HQ-20 composite unmanned aerial vehicle has an overall weigh of 11 kg and can carry a 0.9 kg load. The maximum cruising speed reaches about 74 km/h, and the maximum duration of flight is 15 hours. For a fixed-wing aerial vehicle with an auxiliary vertical lift system, two power systems thereof are separately activated in a vertical take-off and landing mode and a horizontal flight mode, which causes the low efficiency of the whole power device so as to affect the operational performance, such as flight time/distance/maneuverability, of the aerial vehicle, and in addition, the exposed rotor also has a large aerodynamic resistance during horizontal flight, such that it is difficult to achieve high-speed cruising flight.

(3) A tail-sitter vertical take-off and landing aerial vehicle is another vertical take-off and landing solution different from the tilt rotor. Unlike the tilt rotor, the rotor of the tail-sitter aerial vehicle is generally not tiltable, but the propeller power is directly used for vertical take-off and landing, and the flight attitude is changed by means of a flight control system in the air to achieve switching between the vertical take-off and landing and the cruising flight. The tail-sitter vertical take-off and landing aerial vehicle can effectively overcome the performance degradation caused by a redundant power/tilt system, and can utilize airborne systems to the utmost extent during both the vertical take-off and landing and the horizontal flight. The disadvantage thereof is in that the flight state transition process is difficult to control and is greatly affected by wind. In addition, its power system needs to achieve an overall thrust-to-weight ratio of at least 1 or more, such that the disc radius is large, the speed of rotation is high, the aerodynamic resistance is high during the horizontal flight, and it is difficult to achieve a high cruising speed. Moreover, the flying wing structure has a large frontal area during the vertical take-off and landing and the transition, and is greatly affected by gusts.

Most of the existing vertical take-off and landing aerial vehicle configurations are affected by unstable airflow due to the small aerodynamic effect on operating airfoils during the take-off and landing, and a large-size rotary wing exposed outside is also affected by gusts (in addition, the installation of a nose often affects the electronic cabin communication and sensing devices); and the tilting power mechanism is complicated and vulnerable, has poor stability, has low auxiliary redundant power efficiency, and is not suitable for a large-load, long-range design.

SUMMARY OF THE INVENTION

An object of the present invention is to overcome the defects in the prior art described above, and provides a vertical take-off and landing unmanned aerial vehicle having a foldable fixed wing and based on a twin-ducted fan power system.

The object of the present invention can be achieved by taking the following technical solutions:

a vertical take-off and landing unmanned aerial vehicle having a foldable fixed wing and based on a twin-ducted fan power system, the aerial vehicle comprising a fuselage, a foldable wing 3, a ducted fan power system 7 and a retractable landing gear 9, the fuselage being divided into a nose 1, a front fuselage 2, a middle fuselage 5 and a rear fuselage 6, wherein the ducted fan power system 7 is symmetrically distributed on both sides of the rear fuselage 6 in a transverse arrangement, the foldable wing 3 is in an upper single-wing arrangement and is fixed to the front of the middle fuselage 5 via a wing folding shaft 4, the retractable landing gear 9 is arranged at the front of the rear fuselage 6, the aerial vehicle is in a tailless arrangement, the center of gravity of the aerial vehicle is located at the rear of the front fuselage 2 and before the middle fuselage 5, and ducts and the wing are combined in an optimized manner by means of a specific position relationship therebetween.

Further, the nose 1 is an electronic cabin for placement of various sensors and optoelectronic devices therein; the front fuselage 2 is a primary load cabin for carrying a primary energy source and a load; the middle fuselage 5 is a secondary load cabin for carrying an avionics system, a secondary energy source, a driving mechanism for the wing folding shaft 4, and a driving mechanism for the retractable landing gear 9; and the front of the rear fuselage 6 is provided with the retractable landing gear, the middle thereof is provided with the ducted fan power system 7 symmetrically arranged on both sides, and the rear thereof is a conical fairing body.

Further, a foldable configuration is employed for the foldable wing 3, in which the wing is a two-section folding wing and can fold by 36° to 180° towards the belly along a longitudinal axis, and an aileron 8 is arranged at a trailing edge of the wing close to a wingtip.

Further, the twin-ducted fan power systems 7 are symmetrically distributed on both sides of the rear fuselage 6 in a transverse and tail propulsion arrangement, are two in number, and have an axis of rotation thereof being located below a lower surface of the wing.

Further, the ducted fan power system 7 comprises: a duct body 10, a power fan 11, a fan driving mechanism 12, a control servo plane 13, and a control servo plane driving mechanism 14, wherein the power fan 11 is located in the duct body 10, and is connected to the duct body 10 via the fan driving mechanism 12; the control servo planes 13 are located at a duct exit, are four in number, and are of a cross shape surrounding an axis of rotation of the duct; and the control servo plane 13 has an axis of rotation perpendicular to the axis of rotation of the duct, and is connected to the duct body at one end and to the control servo plane driving mechanism 14 arranged in the duct body at the other end.

Further, the specific relative position relationship between the duct and the wing for achieving combined optimization satisfies:

the relation between the distance l1 of the trailing edge of the foldable wing 3 from a plane of a duct entrance and the diameter d of the duct entrance is:

$$0.35d \le l1 \le 0.45d;$$

and the relation between the distance l2 of a plane of a chord line of the foldable wing 3 from a central axis of the duct and the diameter d of the duct entrance is:

$$0.25d \le l2 \le 0.4d.$$

Further, the aerial vehicle is in a tailless arrangement in which the whole aerial vehicle has no conventional horizontal tail, vertical tail, elevator or rudder.

Further, the retractable landing gears 9 are four in number, and each landing gear is adjustable in real time in length.

Further, the control servo plane 13 is movable, and by means of deflection of the control servo plane 13, an attitude control moment is provided to enable the stabilization and control of the flight attitude.

Compared with the prior art the present invention has the advantages and effects as follows.

1. A ducted fan is employed as a power system in the present invention, which is advantageous in: the aerodynamic performance of the fan is optimized by the external contour of duct, the formation of vortex at a fan blade tip is blocked by a duct wall to reduce the power loss of the fan blade tip, and at the same time the duct itself can generate lift under the suction of the fan. Therefore, compared with an isolated propeller, a ducted fan of the same radius has a higher lift-to-weight ratio (generally about 27% higher) at the same energy consumption. At the same time, the duct can generate part of the lift (about 10% of wing lift) during horizontal flight of the aerial vehicle. Therefore, employing the ducted fan as the power system of the vertical take-off and landing aerial vehicle can improve the efficiency in take-off and landing, hovering and flight of the aerial vehicle and effectively reduce the energy consumption; a single ducted fan power source satisfies the multi-mode lift/thrust requirements, has high efficiency, and is suitable for vertical take-off and landing/long-range flight; and at the same time, the ducted fan system has low aerodynamic noise, high safety and high reliability.

2. The ducted attitude control servo plane is arranged in a stable, high-speed slip flow in the duct, reducing external aerodynamic operating surfaces (tails, etc.), and avoiding the instability of low-speed (take-off and landing) aerodynamic disturbance failure from conventional designs and the gust disturbance of large-size exposed propellers; and the ducted power configuration does not require a tilting mechanism, such that the system reliability is improved, and at the same time, the shape is simple to effectively reduce the radar reflection area.

3. The tail-propulsion power arrangement guarantees the nose not affected by propellers, and can facilitate the installation of various sensors and communication devices; and the tail-propulsion ducted fan can obtain the maximum arm of force for attitude (pitch, roll) control, and can improve its anti-disturbance capacity to the utmost extent.

4. The invention employs a specific duct-wing relative position to enable the combined optimization. The ducted fan power system is located below the trailing edge of the wing, and the Coanda effect is created near the wing under the suction of the ducted fan, thereby effectively improving the adverse pressure gradient on an upper surface of the wing and slowing down the separation of airflow at a boundary layer of the wing, such that the aerodynamic performance of the wing is greatly enhanced. Compared with a traditional fixed-wing structure, the lift coefficient of the wing increases by 25%, the stall angle of attack increases to 40°, and the overall lift-to-drag ratio increases by 15%. This technology improves the stability and safety of the switching process. Therefore, the aerial vehicle of the present invention can further reduce the power loss during the take-off and landing and extend the flight time, and can perform short-distance, ground-sliding take-off and landing under extreme conditions that are not suitable for the vertical take-off and landing.

5. The foldable wing is stowed during the vertical take-off and landing, which can decrease the frontal area of the wing exposure to crosswind to enhance the anti-wind capability of the aerial vehicle, and the wing is expanded during the horizontal flight, which can obtain large lift.

6. The ducted fan is affected by crosswind during operation to generate momentum resistance at the plane of the duct entrance, and the resistance is the primary resistance during the low-speed flight of the aerial vehicle. Since the center of gravity of the aerial vehicle is positioned relatively forward (at a higher position when vertically placed), and the ducted fan and its control servo plane are positioned relatively backward (at a lower position when vertically placed), the whole aerial vehicle generates a low head moment to the gravity by the crosswind resistance during the vertical take-off and landing and the hovering. Therefore, in a strong crosswind environment, the aerial vehicle can automatically reach a stable state with a small inclination against the wind. This mechanism of action enables the aerial vehicle of the present invention to greatly improve its anti-disturbance capability during the vertical take-off and landing. In addition, the landing angle of the aerial vehicle can be adjusted by means of the retractable landing gear, to cooperate with the aerial vehicle to achieve tilted anti-wind take-off and landing and further improve its stability.

BRIEF DESCRIPTION OF THE DRAWINGS

The drawings are used to provide a further understanding of the present invention and constitute a part of the description. Together with the embodiments of the present invention, the drawings are used to explain the present invention and do not constitute a limitation on the present invention. In the drawings:

FIGS. 8(a) and 8(b) are comparison views of the CFD simulation of flow field of the duct-wing combined optimization of the present invention and a traditional fixed wing during the flight at an angle of attack of 40°, in which

DETAILED DESCRIPTION OF EMBODIMENTS

In order to make the objectives, technical solutions and advantages of embodiments of the present invention clearer, the technical solutions in embodiments of the present invention will be clearly and completely described below with reference to the accompanying drawings in the embodiments of the present invention. Apparently, the described embodiments are a part, but not all of the embodiments of the present invention. Based on the embodiments of the present invention, all other embodiments obtained by those of ordinary skill in the art without involving any inventive effort fall within the scope of protection of the present invention.

EMBODIMENTS

Figure 1:
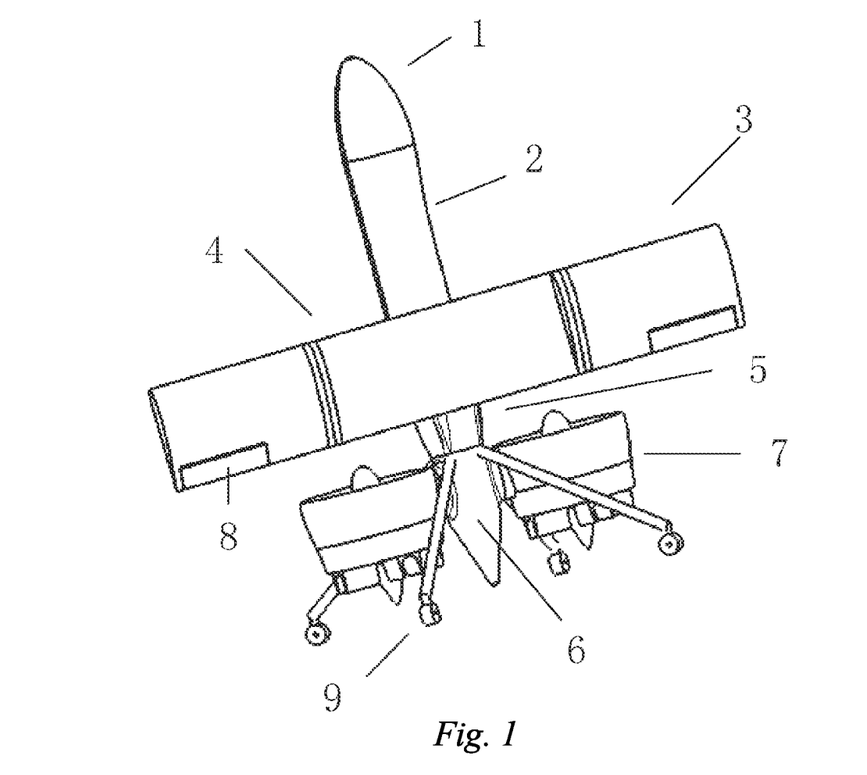
FIG. 1 is a three-dimensional schematic view of an aerial vehicle of the present invention.

A three-dimensional schematic view of various main components of an aerial vehicle of this embodiment is as shown in FIG. 1, the aerial vehicle comprising: a fuselage, a foldable wing 3, ducted fan power systems 7 and a retractable landing gear 9, the fuselage being divided into a nose 1, a front fuselage 2, a middle fuselage 5 and a rear fuselage 6, wherein the ducted fan power systems 7 are symmetrically distributed on both sides of the rear fuselage 6 in a transverse arrangement, the foldable wing 3 is arranged at the front of the middle fuselage 5 in an upper single-wing arrangement, the retractable landing gear 9 is arranged at the front of the rear fuselage 6, the aerial vehicle is in a tailless arrangement, the center of gravity of the aerial vehicle is located at the rear of the front fuselage 2, and ducts and the wing are combined in an optimized manner by means of a specific position relationship therebetween.

Figures 2A, 2B, 2C:
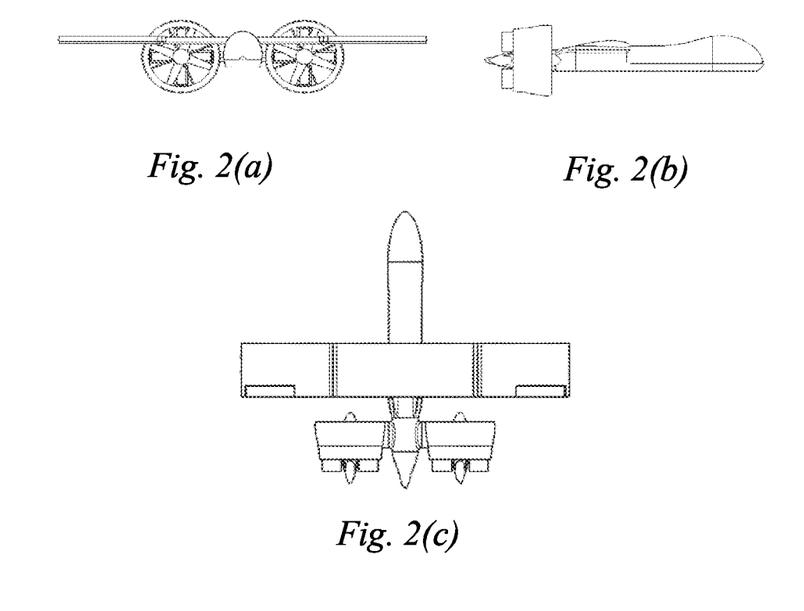
FIG. 2(a) is a front view of the aerial vehicle of the present invention (with a landing gear stowed)
FIG. 2(b) is a left view of the aerial vehicle of the present invention (with the landing gear stowed)
FIG. 2(c) is a side view of the aerial vehicle of the present invention (with the landing gear stowed)
Figure 7:
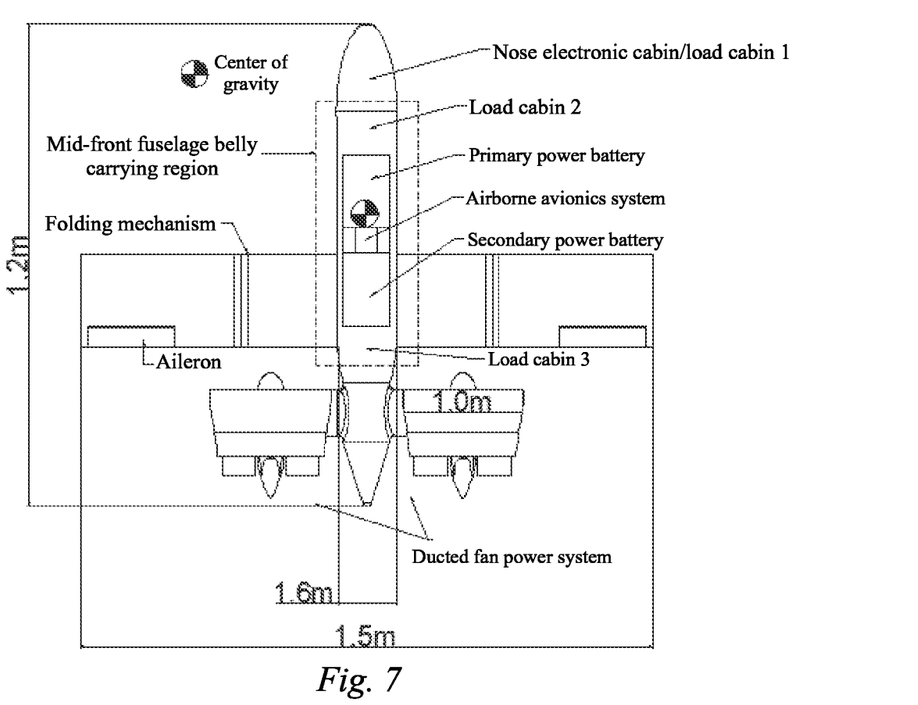
FIG. 7 is a schematic view of a system of an embodiment of the present invention.

In this embodiment, an aerodynamic arrangement employed by the aerial vehicle comprises: a foldable rectangular upper singe wing, a twin-tail propulsion ducted-fan power system, and a retractable landing gear arrangement, as shown in FIGS. 2(a), 2(b) and 2(c). The main overall dimensions include:

the length of wingspan: 1.5 m
the aspect ratio: 7.5
the dimension of fuselage: 0.16 m×0.16 m×1.2 m
the outer diameter of duct: 0.33 m
the radius of fan: 0.116 m, employing a variable-pitch four-blade fan
the overall weight: 20 kg (containing an effective load of 5 Kg)
the flight time: 1 h The main overall dimensions and the system distribution are as shown in FIG. 7.

In this embodiment, the aerial vehicle employs electric power, and uses an electric motor as a power source and a lithium battery as an energy source.

In this embodiment, the nose 1 is partially carried with an electronic cabin and a load cabin 1, and installed with various sensors, including an airspeed tube, a radar, a visible light/infrared camera and an electronic compass.

In this embodiment, the front fuselage 2 has a load cabin 2, a primary power battery, and an airborne avionics system (comprising a sensor, a main control computer, a navigation flight control module, a communication module and an energy management module) placed therein, the belly carries the primary mission load, and this part is also the position where the weight of the whole aerial vehicle is concentrated.

In this embodiment, the middle fuselage 5 has a secondary power battery, a folding mechanism, an actuating mechanism of the landing gear, and a driving motor placed therein, the belly carries the secondary load, and this part is the position where the secondary weight of the whole aerial vehicle is concentrated.

In this embodiment, the foldable wing 3 is in an upper single-wing arrangement, a rectangular straight-wing arrangement and a Clark-Y wing profile arrangement to improve the medium-speed performance thereof (the low-speed performance is guaranteed by using a wing/duct combined system design), and the foldable wing 3 is arranged at the front of the middle fuselage 5 in an upper singe-wing arrangement, and is of a foldable configuration. The foldable wing 3 is a two-section folding wing, and is foldable by 36° to 180° towards the belly along a longitudinal axis. An aileron 8 is arranged at a trailing edge of the wing close to a wingtip.

Figure 3:
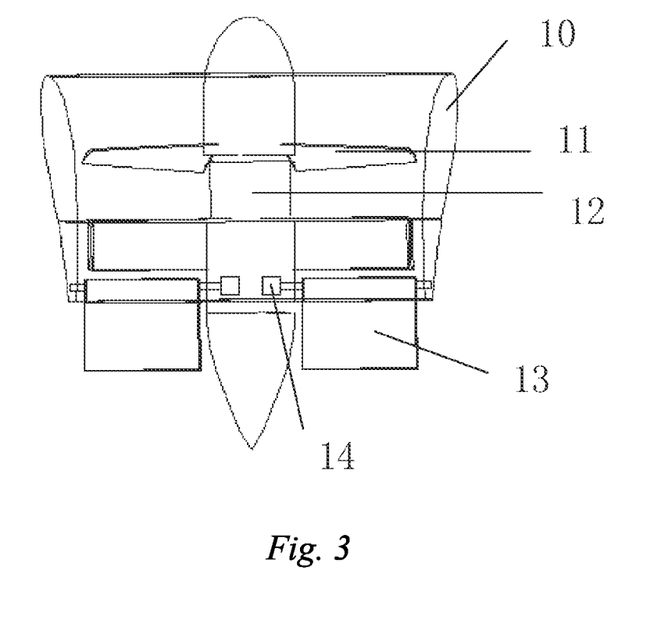
FIG. 3 is a structural schematic view of a ducted fan power system of the aerial vehicle of the present invention.

In this embodiment, the twin-ducted fan power systems 7 are symmetrically distributed on both sides of the rear fuselage 6 in a transverse and tail propulsion arrangement, are two in number, and have an axis of rotation thereof being located below a lower surface of the wing. The twin-ducted fan power system 7 comprises: a duct body 10, a power fan 11, a fan driving mechanism 12 (an electric motor in this embodiment), a control servo plane 13, and a control servo plane driving mechanism 14 (an electric servo engine), as shown in FIG. 3.

The twin-ducted fan power system 7 has the power fan 11 located in the duct, employs a variable-pitch four-blade fan, and is connected to the duct body 10 via the fan driving mechanism 12; and the control servo planes 13 are located at a duct exit, are four in number, and are of a cross shape surrounding an axis of rotation of the duct. The control servo plane 13 has an axis of rotation perpendicular to the axis of rotation of the duct, and is connected to the duct body at one end and to the control servo plane driving mechanism 14 arranged in the duct body at the other end.

The duct body 10 employs a specific streamlined design in cross section, and with this structural arrangement, the performance of vertical take-off and landing can be improved, the hovering efficiency and anti-disturbance capability are improved, and at the same time, the duct can also generate part of the lift during the horizontal flight; and due to the structure of the upper single wing, under the affection by the trapped vortex at the trailing edge of the wing and the position of the wing, the duct can generate part of the lift (about 10% of wing lift) even at an angle of attack of 0°, improving the overall efficiency. The movable control servo plane 13 is arranged at the duct exit, and the attitude control of the aerial vehicle is implemented by tilting the servo plane. The center of gravity is positioned in a region between the front fuselage and a leading edge of the wing according to a conventional fixed-wing arrangement, the control servo plane 13 can generate a large control moment on the center of gravity, enabling the aerial vehicle to obtain the excellent control performance.

Figure 6A:
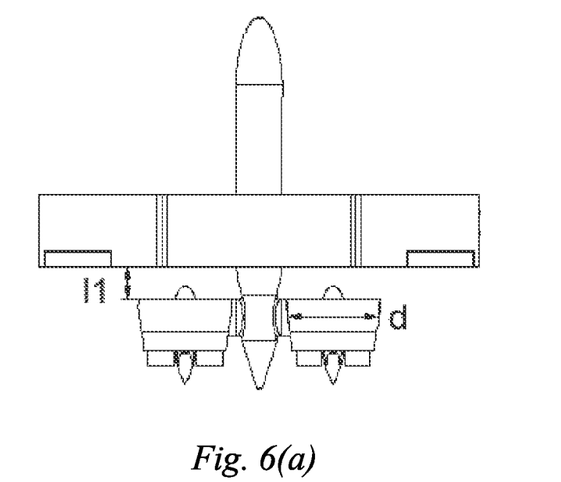
FIG. 6(a) is a schematic view 1 of a duct-wing combined optimization feature dimension of the present invention.
Figure 6B:
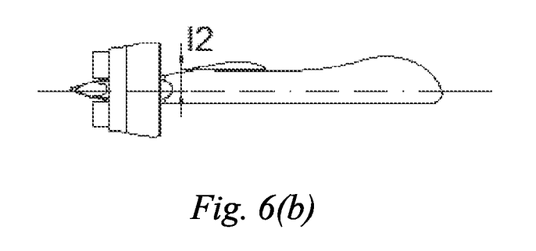
FIG. 6(b) is a schematic view 2 of a duct-wing combined optimization feature dimension of the present invention.
Figure 8A:
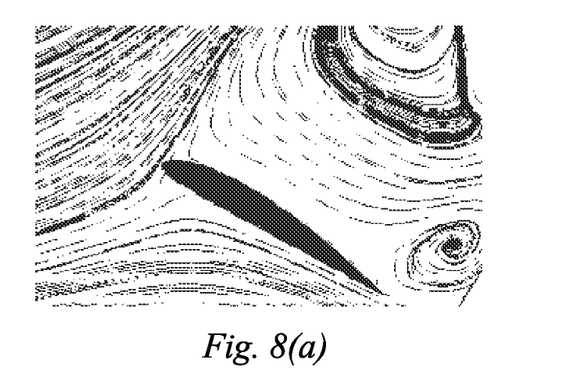
FIG. 8(a) is a view of CFD simulation of flow field for the traditional individual wing with stall.
Figure 8B:
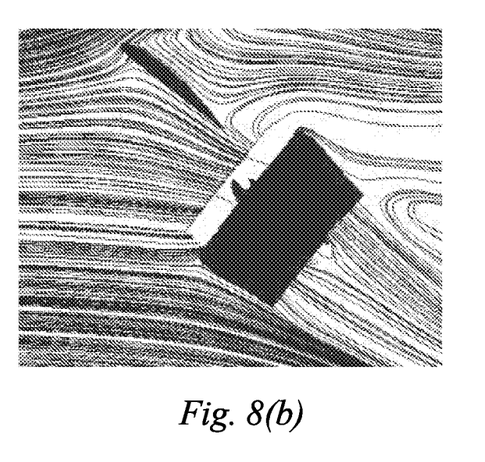
FIG. 8(b) is a view of CFD simulation of flow field under the stall-free duct-wing combined optimization.

In this embodiment, the specific duct-wing relative position is employed to enable the combined optimization. As shown in FIGS. 6(a) and 6(b), in this embodiment, the relative position of the wing and the duct employs l1=0.4d, l2=0.35d. The Coanda effect is created at the trailing edge of the wing by suction of the duct, slowing down the separation of airflow at a boundary layer, increasing the airfoil stalling angle of attack, and at the same time generating a low-pressure area at an upper portion of the wing to increase the lift coefficient of the wing. The CFD simulation of flow field for the aerial vehicle of this embodiment and the traditional fixed-wing aerial vehicle during the flight at 30 m/s at an angle of attack of 40° is as shown in FIG. 8. The simulation result shows that this configuration, compared with the traditional fixed-wing structure, has the lift coefficient of the wing increased by 25%, the stalling angle of attack increased to 40°, and the overall lift-to-drag ratio increased by 15%.

In this embodiment, the aerial vehicle is in a tailless arrangement. The whole aerial vehicle has no conventional horizontal tail, vertical tail, elevator or rudder. By means of deflection of the control servo plane 13, an attitude control moment is provided to enable the stabilization and control of the flight attitude.

The retractable landing gears 9 are arranged at the front of the rear fuselage 6 and are four in number, and each landing gear is adjustable in real time in length.

Figure 4A:
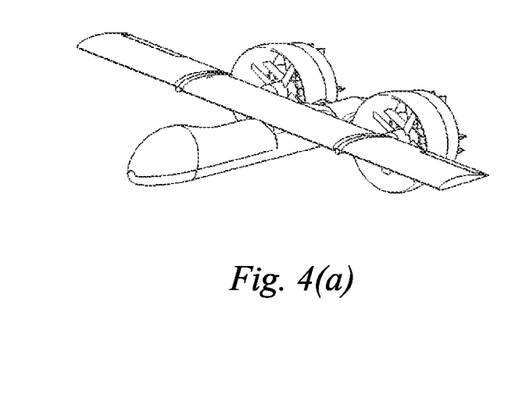
FIG. 4(a) is a three-dimensional schematic view of the aerial vehicle of the present invention, with a wing expanded during a horizontal flight.
Figure 4B:
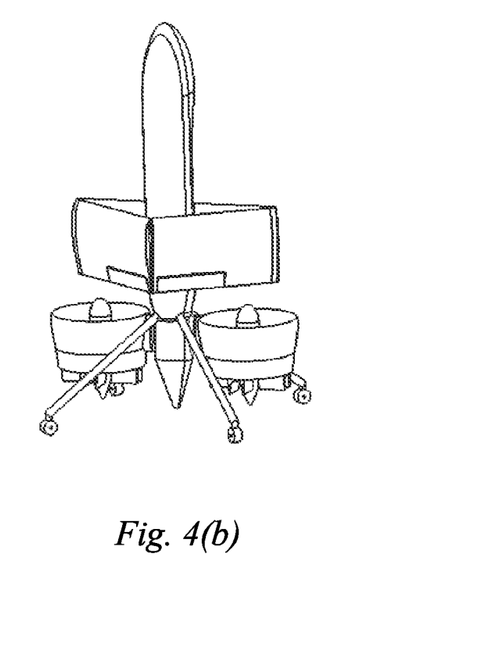
FIG. 4(b) is a three-dimensional schematic view of the aerial vehicle of the present invention, with a wing folded during vertical take-off and landing.

The working principle and process of the present invention:

as shown in FIG. 4(b), the foldable wing 3 is stowed during the vertical take-off and landing, which can decrease the frontal area of the wing exposure to crosswind and enhance the anti-wind capability of the aerial vehicle; and as shown in FIG. 4(a), the wing is expanded during the horizontal flight, which can obtain larger lift.

Figure 5:
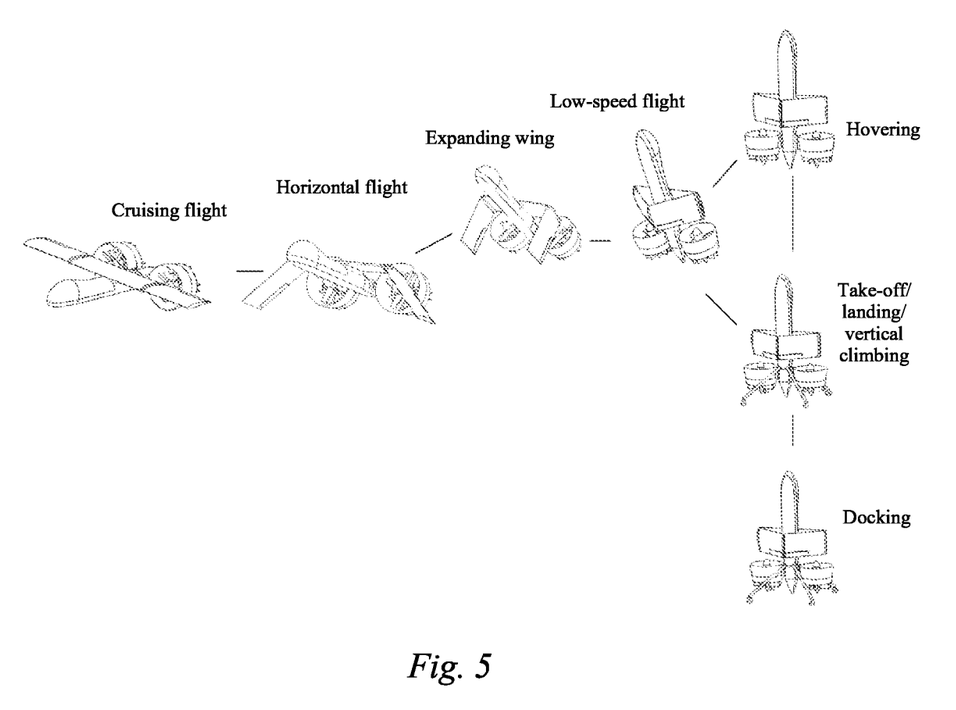
FIG. 5 is a schematic view of a multi-mode flight (the vertical take-off and landing and the horizontal flight) and its transition switch processes of an aerial vehicle of the present invention.

As shown in FIG. 5, the aerial vehicle of the present invention is at a vertical attitude during docking at the ground with the landing gear down. When the fan in the duct operates, a vertically upward lift is generated, enabling the vertical take-off and landing of the aerial vehicle. At the same time, the foldable wing 3 is stowed to decrease the frontal area of the aerial vehicle exposure to crosswind and to improve the anti-disturbance capability. By means of deflection of the control servo plane 13, a control moment is generated to control the attitude of the aerial vehicle. When the aerial vehicle is out of the vertical attitude, the lift generated by the ducted fan power system 7 will generate a component in a horizontal direction, enabling the horizontal flight of the aerial vehicle. When the flight attitude and speed reach a certain range, the foldable wing 3 is expanded, the fuselage enters a horizontal flight state, and under this state, the aerial vehicle has various characteristics similar to those of the conventional fixed-wing aircraft and can perform cruising flight at a higher speed and with a lower energy consumption.

Figure 9:
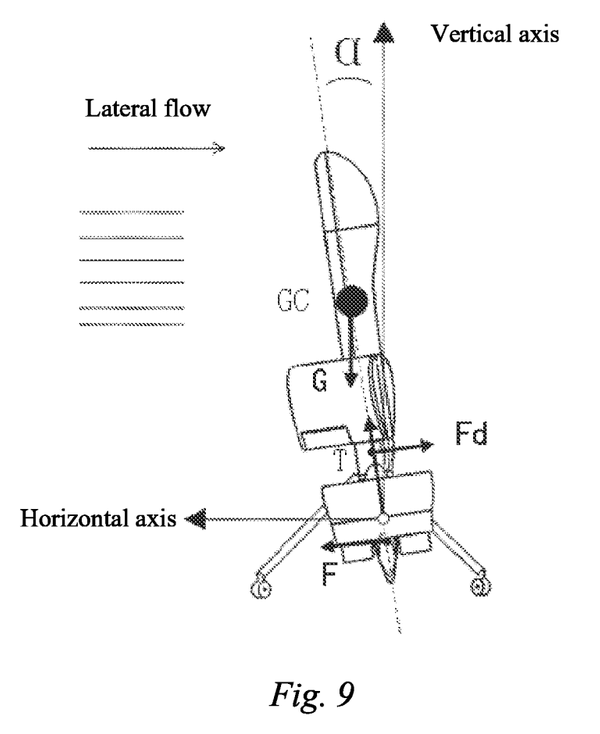
FIG. 9 is a schematic view of the anti-crosswind principle of the aerial vehicle of the present invention.

As shown in FIG. 9, in the figure, G is gravity, T is duct lift, Fd is momentum resistance, F is servo plane control force, α is an anti-wind balance inclination, and an anti-disturbance mechanism of the aerial vehicle of the present invention at a crosswind environment is as follows.

a. A stabilizing effect of the fan of the duct on crosswind is provided. The power fan 11 of the duct can generate a momentum resistance Fd above the position near an entrance of the duct body 10 in crosswind, the resistance is the primary resistance under a take-off and landing condition, and the present invention employs a design of high (front) position of center of gravity, such that the momentum resistance generates a low head moment on the center of gravity, and the duct can automatically tilt by an α angle against the wind to reach a self-stabilizing state.

b. The control servo plane 13 is arranged in a high-speed slip flow in the duct, is less disturbed by flight conditions, and can generate a stable control force F that has a large moment on the center of gravity of the aerial vehicle. By means of the control of the servo plane, the duct can reach a stable state with a small inclination against the wind under crosswind and keep the attitude within a certain range. For crosswind not greater than 16 m/s, the aerial vehicle of the present invention has the maximum balance angle of 14.8°.

c. The landing gear cooperates with the tilt angle of the aerial vehicle for expansion and retraction, such that the landing plane of the landing gear always keep parallel to a take-off and landing platform, and in this embodiment, the adjustable maximum angle of the landing gear plane is 25°, the maximum anti-wind angle required by the aerial vehicle is 15°, and therefore the aerial vehicle can implement tilted landing.

The above-described embodiments are preferred embodiments of the present invention; however, the embodiments of the present invention are not limited to the above-described embodiments, and any other change, modification, replacement, combination, and simplification made without departing from the spirit, essence, and principle of the present invention should be an equivalent replacement and should be included within the scope of protection of the present invention.

The invention claimed is:

1. A vertical take-off and landing unmanned aerial vehicle, the aerial vehicle comprising a fuselage, a foldable wing, two ducts and a retractable landing gear, the fuselage being divided into a nose, a front fuselage, a middle fuselage and a rear fuselage along a longitudinal axis of the fuselage, wherein the two ducts are symmetrically distributed on both sides of the rear fuselage in a transverse and tail propulsion arrangement, each duct comprises a ducted fan, the ducted fan has an axis of rotation being located below a lower surface of the wing, and the axis of rotation of the ducted fan is substantially parallel to the longitudinal axis of the fuselage at all times;

the foldable wing is in an upper single-wing arrangement and is fixed to the front of the middle fuselage via a wing folding shaft, the retractable landing gear is arranged at the front of the rear fuselage, the aerial vehicle is in a tailless arrangement, the center of gravity of the aerial vehicle is located at the rear of the front fuselage and before the middle fuselage, and the ducts and the wing are combined in an optimized manner by means of a specific position relationship therebetween.

2. The vertical take-off and landing unmanned aerial vehicle according to claim 1, wherein the nose is an electronic cabin for placement of various sensors and optoelectronic devices therein; the front fuselage is a primary load cabin for carrying a primary energy source and a load; the middle fuselage is a secondary load cabin for carrying an avionics system, a secondary energy source, a driving mechanism for the wing folding shaft, and a driving mechanism for the retractable landing gears; and the middle of the rear fuselage is provided with the ducts symmetrically arranged on both sides, and the rear thereof is a conical fairing body.

3. The vertical take-off and landing unmanned aerial vehicle according to claim 1, wherein a foldable configuration is employed for the foldable wing, in which the wing is a two-section folding wing and can fold by 36° to 180° towards the belly along a longitudinal axis, and an aileron is arranged at a trailing edge of the wing close to a wingtip.

4. The vertical take-off and landing unmanned aerial vehicle according to claim 1, wherein the specific relative position relationship between the ducts and the wing for achieving combined optimization satisfies:

the relation between the distance l1 of the trailing edge of the foldable wing from a plane of a duct entrance and a diameter d of the duct entrance is:

$$0.35d \leq l1 \leq 0.45d;$$

and the relation between the distance l2 of a plane of a chord line of the foldable wing from a central axis of the duct and the diameter d of the duct entrance is:

$$0.25d \leq l2 \leq 0.4d.$$

5. The vertical take-off and landing unmanned aerial vehicle according to claim 1, wherein the aerial vehicle is in the tailless arrangement in which the whole aerial vehicle has no conventional horizontal tail, vertical tail, elevator or rudder.

6. The vertical take-off and landing unmanned aerial vehicle according to claim 1, wherein the aerial vehicle comprises four retractable landing gears, and each landing gear is adjustable in real time in length.

7. The vertical take-off and landing unmanned aerial vehicle according to claim 1, wherein the duct further comprises: a duct body, a fan driving mechanism, a control servo plane, and a control servo plane driving mechanism, wherein the ducted fan is located in the duct body, and is connected to the duct body via the fan driving mechanism; the control servo planes are located at a duct exit, are four in number, and are of a cross shape surrounding the axis of rotation of the ducted fan; and the control servo plane has an axis of rotation perpendicular to the axis of rotation of the ducted fan, and is connected to the duct body at one end and to the control servo plane driving mechanism arranged in the duct body at the other end.

8. The vertical take-off and landing unmanned aerial vehicle according to claim 7, wherein the control servo plane is movable, and by means of deflection of the control servo plane, an attitude control moment is provided to enable the stabilization and control of the flight attitude.

9. A vertical take-off and landing unmanned aerial vehicle, the aerial vehicle comprising a fuselage, a foldable wing, two ducts and a retractable landing gear, the fuselage being divided into a nose, a front fuselage, a middle fuselage and a rear fuselage along a longitudinal axis of the fuselage, wherein the two ducts are symmetrically distributed on both sides of the rear fuselage in a transverse and tail propulsion arrangement, each duct comprises a ducted fan, the ducted fan has an axis of rotation being located below a lower surface of the wing, and the axis of rotation of the ducted fan is substantially parallel to the longitudinal axis of the fuselage at all times;

the foldable wing is in an upper single-wing arrangement and is fixed to the front of the middle fuselage via a wing folding shaft, the retractable landing gear is arranged at the front of the rear fuselage, the aerial vehicle is in a tailless arrangement, the center of gravity of the aerial vehicle is positioned in a region between the front fuselage and a leading edge of the wing; and the ducts and the wing are combined in an optimized manner by means of a specific position relationship therebetween.

\* \* \* \* \*

UNITED STATES PATENT AND TRADEMARK OFFICE
CERTIFICATE OF CORRECTION

PATENT NO. : 11,634,222 B2
APPLICATION NO. : 16/613930
DATED : April 25, 2023
INVENTOR(S) : Pei et al.

It is certified that error appears in the above-identified patent and that said Letters Patent is hereby corrected as shown below:

On the Title Page

Item (73), Assignee, Line 1, after "Technology" insert -- , (CN) --

Signed and Sealed this
Eleventh Day of July, 2023

Katherine Kelly Vidal
*Director of the United States Patent and Trademark Office*